Aug. 1, 1939.  G. W. WATSON  2,167,921
AUTOMATIC GEARSHIFT
Filed Dec. 30, 1937  3 Sheets-Sheet 2
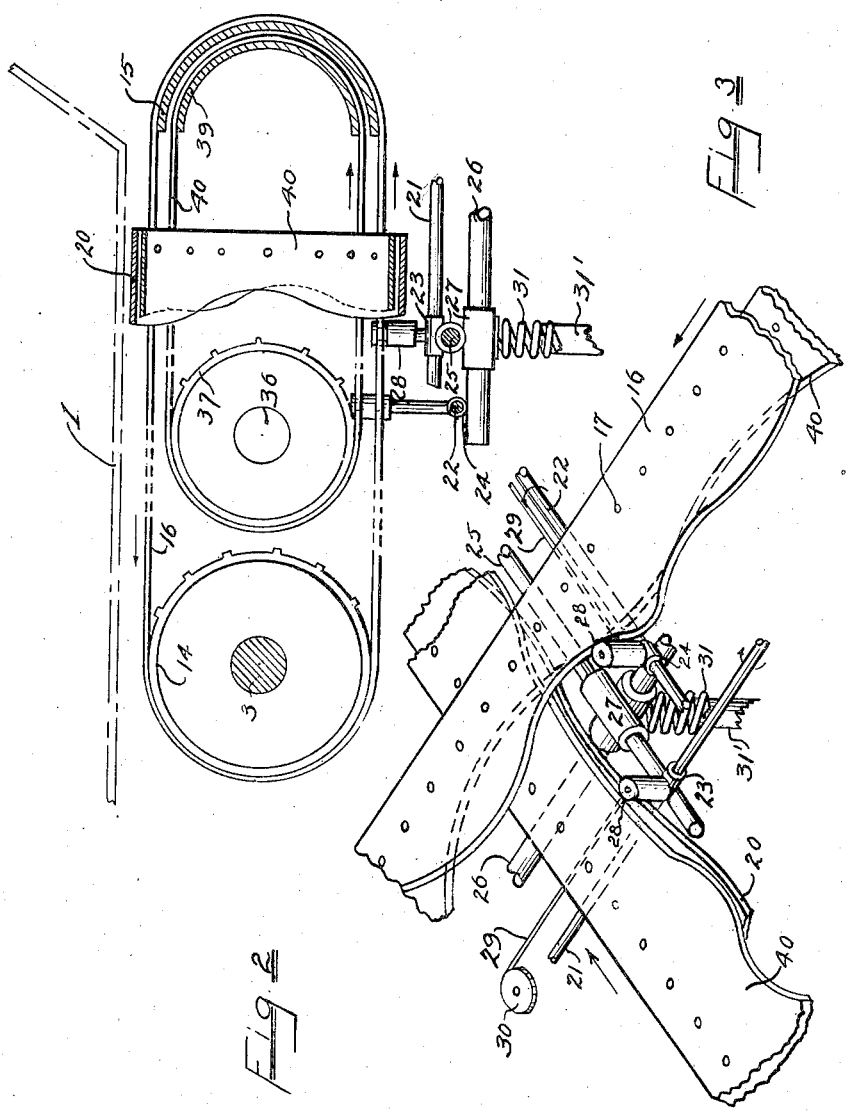
INVENTOR
GLENN W. WATSON
BY Samuel Weisman
ATTORNEY

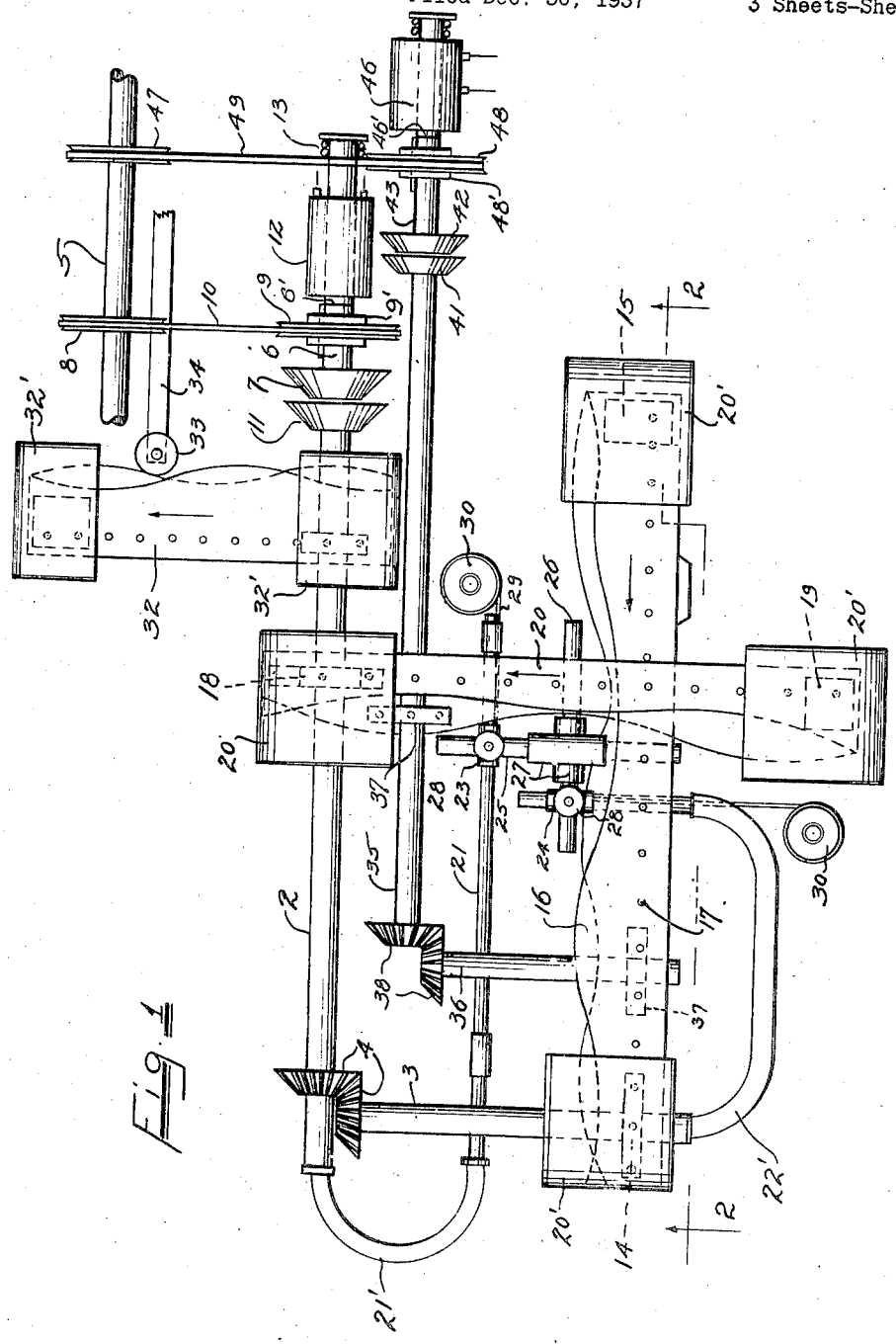

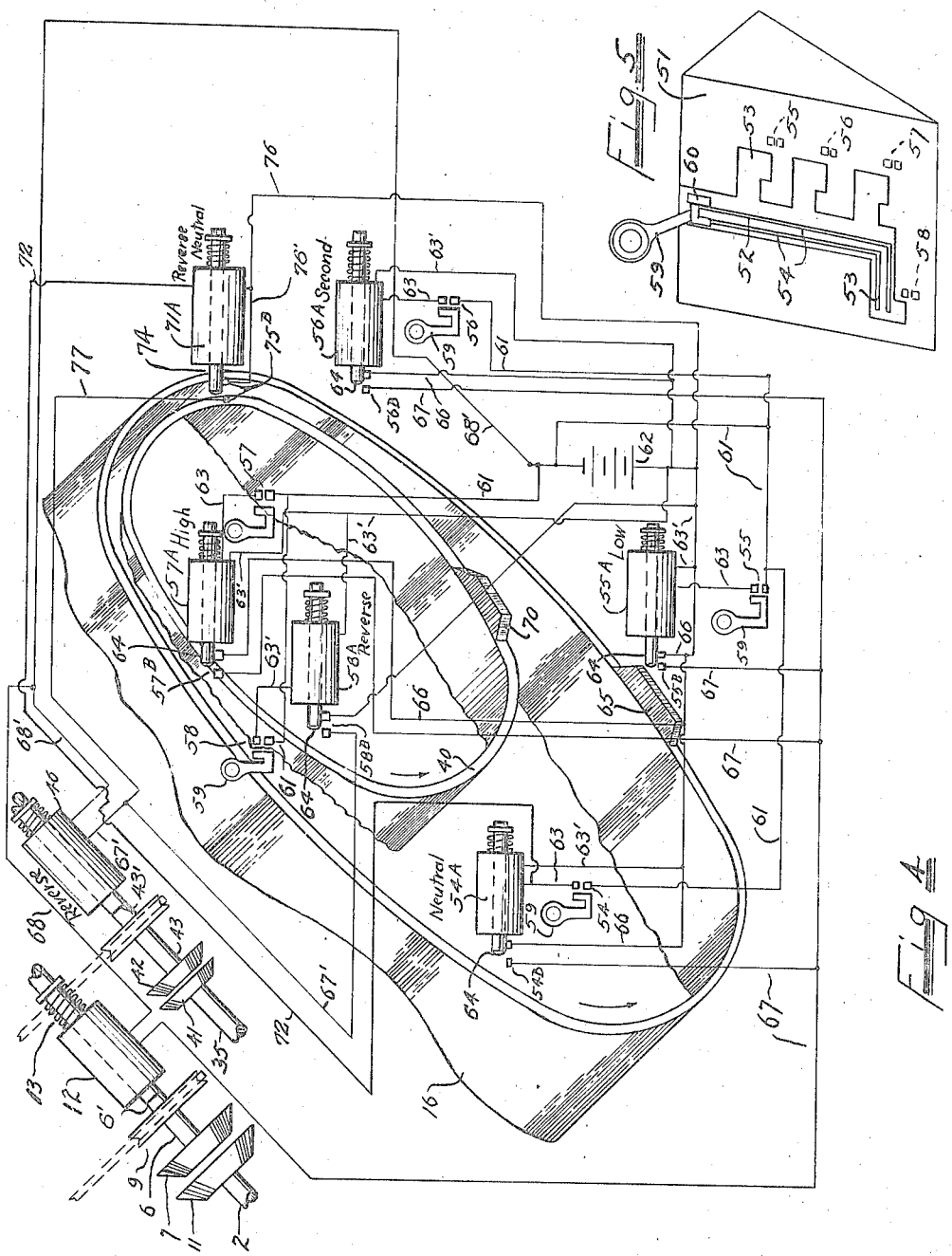

Patented Aug. 1, 1939

2,167,921

UNITED STATES PATENT OFFICE 2,167,921

AUTOMATIC GEARSHIFT

Glenn W. Watson, Detroit, Mich.

Application December 30, 1937, Serial No. 182,548

19 Claims. (Cl. 74—334)

The present invention pertains to an automatic gear shifting and clutch operating mechanism for motor vehicles and other machines requiring a variable gear ratio.

Among the objects of the invention are to provide a device of this character that is entirely mechanical in operation, as distinguished from electric or hydraulic operation, a device synchronized with the motor to operate at a rate having a constant ratio to the speed of the motor, and one that has a smooth and progressive action while passing successively from each gear ratio to the next. In the latter connection, the construction of the device is such that, while one of the higher gear ratios is selected by a single movement of the manual control or operating member, the mechanism goes through the intermediate or lower gear ratios and operates the clutch synchronously in coming to the selected ratio.

As already indicated, the invention operates on mechanical principles insofar as the actual shifting of gears is concerned, and this mode of operation is accomplished by a unique mechanism for shifting a gear shift lever or fork similar to the corresponding member used in conventional constructions. In other words, the usual gear shift lever is considerably reduced in length and this member is actuated by the unique mechanism previously referred to.

This mechanism comprises a pair of developed matrices movable relatively to each other and acting upon a carriage so supported and guided as to be capable of movement in any direction in a given plane, the carriage being joined to the aforementioned short lever or fork in order to shift the latter in a predetermined path according to the development of the matrices. The matrices are geared to the motor but are set in motion only when the transmission ratio is to be altered. For this purpose, a clutch is provided in the driving train, and the clutch is preferably operated electrically as by means of a solenoid.

Within reach of the operator is a control box containing several pairs of spaced contacts representing the several gear ratios as well as the neutral position. A movable controller or handle brought into engagement with any pair of contacts completes a circuit to the clutch, whereby the pair of matrices is set in motion. In the making of the clutch circuit, a circuit-breaker or matrix stopping device is prepared so that it opens the clutch circuit when the matrices reach the position that finally effects the selected gear ratio. The circuit-breakers or stopping devices correspond in number to the controller positions in the gear box and are located with reference to one pair of the matrices to be operated thereby, respectively, when the matrices have completed the selected change in gear ratio.

A single matrix movable with the others operates the transmission clutch to disengage or engage the same during the actual shift from one gear ratio to another. When the transmission mechanism passes through several gear ratios in coming to the selected ratio, the clutch is nevertheless automatically disengaged and engaged as each shift is being made.

For reverse gear there is an independent pair of matrices driven through a separate clutch similar to that already described and having a pair of contacts in the controller box. These matrices are also equipped with a circuit-breaker or stopping mechanism, similar to those already described, and designed to stop the matrices when the reverse shift has been completed. In order to shift out of reverse gear when desired, the solenoid for the reverse clutch is also wired to the pair of contacts representing neutral in the control box, so that the reverse matrices are propelled on bridging these contacts with the manual contactor. A second circuit-breaker or stopping device for the reverse matrices is associated with the last named contacts and brings the matrices to rest when they have returned to neutral position. In the operation of the device it is necessary to bring the contactor to neutral position in shifting out of reverse to any other position, as is now customary with manually operated gear shifts.

The invention is fully disclosed by way of example by the following description and the accompanying drawings, in which Figure 1 is a plan view of the apparatus;

Figure 2 is a section on the line 2—2 of Figure 1;

Figure 3 is a detail perspective view;

Figure 4 is a wiring diagram, and

Figure 5 is a perspective view of the controller box.

Reference to these views will now be made by use of like characters employed to designate corresponding parts throughout.

The mechanism is supported in any suitable manner on the automotive vehicle or other machine to be operated thereby. In the present instance, the mechanism is illustrated and described with relation to the gear shift lever of an automotive vehicle, and in such case is preferably supported beneath the floor boards 1, as illustrated in Figure 2. The matrices for determining the movement of the gear shift lever, as set forth above, are driven from shafts 2 and 3 respectively, preferably mounted at right angles to each other and geared together by bevel gears 4, as shown in Figure 1. The drive for the shaft 2 may be taken, for example, from the timing gear shaft 5 or a shaft geared thereto. Parallel to the shaft 5 is a clutch shaft 6 carrying at one end a clutch member 7. The shafts 5 and 6 carry pulleys 8 and 9 respectively joined by a driving belt 10. Adjacent to the clutch member 7, the shaft 2 carries a complementary clutch member 11. The shaft 6, magnetically broken at 6', is in the nature of an armature within a solenoid 12 and normally retracted from the shaft 2 by a return spring 13. The shaft 6 slides through the pulley 9 with which it has a key connection and which is held by stops 9' against shifting laterally. When the solenoid 12 is energized by the means presently to be described, the shaft 6 is projected to bring the member 7 into engagement with the complementary member 11, whereupon a drive to the shafts 2 and 3 is established from the shaft 5.

The shaft 3 carries a sprocket wheel 14 opposite which is a semi-circular guide member 15 (Figure 2). One of the endless matrices 16 is trained over the members 14 and 15 and is formed with a series of perforations 17 to receive the teeth of the sprocket wheel.

Similarly, the shaft 2 carries a sprocket wheel 18 with an opposite guide 19 for supporting and driving the intersecting endless matrix 20. The ends of the matrices are enclosed in shields 20'.

A pair of rods 21 and 22 are suitably journaled in parallel relation to the matrices 16 and 20 respectively. These shafts are rotated from the shafts 2 and 3 through flexible cables 21' and 22' for a purpose that will presently be described. The shafts 21 and 22 carry slidable sleeves 23 and 24 respectively which, in turn, have guide rods 25 and 26 fixed thereto at right angles to the shafts 21 and 22 respectively. The rods 25 and 26 cross one another as may be seen more clearly in Figures 2 and 3. At their intersection they pass slidably through a double bearing or carriage 27 consisting, in fact, of two bearings secured to one another at the proper angle to receive the shafts. Each sleeve 23, 24 carries a roller 28 for engaging the developed edge of the corresponding matrix. A tape 29 is extended from each roller across the corresponding matrix to a spring pulley 30, whereby the rollers are maintained in a firm but yielding engagement with their matrices.

A resilient member 31, such as a spring or rubber block, is secured to the carriage 27. A gear shift lever 31' (Figures 2 and 3) extends downward from the member 31 into the transmission mechanism. This corresponds to the conventional member at the lower end of the usual gear shift lever and is actuated, according to this invention, by the carriage 27 instead of the usual hand lever.

In the operation of the device as thus far described, it will be understood that the curved edges of the matrices 16 and 20 are developed in such a manner as to move the carriage 27, and hence the member 31', through a pre-determined path. The movement of the carriage in the direction perpendicular to or outward from either matrix is enabled by the slidable mounting of the carriage on the guides 25 and 26 respectively perpendicular to the matrices. Movement of the carriage parallel to either matrix is enabled by the slidable mounting of the rods 25 and 26 on the shafts 21 and 22 respectively perpendicular to the matrices. The sliding movement of the bearings 23 and 24 on the shafts 21 and 22 is facilitated by the rotation of the latter through the flexible shafts 21' and 22' as set forth above. In other words, each matrix alone moves the engaging roller 28 in a rectilinear path perpendicular to the line of travel of the matrix, and the two paths thus produced by the perpendicular matrices 16 and 20 combined, through the means described, results in movement of the carriage 27 in any direction in a given plane.

The matrices 16 and 20 are designed to move the lever 31' from the lowest to the highest forward gear ratio successively and progressively through the intervening ratios. Without considering the selection of the gear ratio, which is described hereinafter, it is now evident that the clutch must be disengaged prior to change of gear ratio.

The mechanism for this operation is shown in Figure 1. It includes a single matrix 32 driven from shaft 2 by a sprocket wheel on the latter. The matrix is engaged by a roller 33 carried by an arm 34 suitably guided for rectilinear movement and adapted to actuate a member similar to a clutch pedal. The matrix 32 is so related to the pair of matrices 16 and 20 that, just before a shift is to be effected by the latter, one of the high spots of the matrix 32 engages the roller 33 to move the arm 34 outwardly to disengage the clutch. In this connection it is to be noted that the matrix 32 is in motion only when the other matrices are actuated, since all are dependent on the engagement of the clutch 7, 11. The ends of matrix 32 are enclosed in shields 32'.

The lever 31' is thrown into reverse position by an independent but similar system, comprising also a pair of intersecting matrices positioned respectively within the matrices 16 and 20. A pair of rotatable shafts 35 and 36 are journaled perpendicular to one another as shown in Figure 1 and carry each a sprocket wheel 37, one of the pair appearing in Figure 2. The shafts 35 and 36 are geared together by bevel gears 38. Opposite each sprocket wheel 37 is a semi-circular guide 39 mounted within one of the similar guides 15. Over each sprocket wheel 37 and the opposed guide 39 is trained a matrix 40. These matrices intersect one another beneath the matrices 16 and 20, as may be seen in Figure 3, which illustrates the lower laps of the several matrices. The rollers 28 engage the lower laps of the matrices 16 and 20 and are of sufficient height to be engaged by the lower laps of the matrices 40, as may be seen in Figure 2.

The shaft 35 carries a clutch member 41 adapted to be engaged by a complementary member 42 on a shaft 43 magnetically broken at 43'. The latter constitutes the armature of a solenoid 46 operated in the same manner as the solenoid 12 previously described. The shaft 35 is driven from shaft 5 through pulleys 47 and 48 thereon and a belt 49. The shaft 43 has a key slide in pulley 48, and the pulley is held by stops 48' against shifting laterally.

When the reverse matrices are in operation, the forward matrices 16 and 20 being then stationary, the latter will not obstruct the rollers 28 from engagement with any part of the developed edge of either matrix 40. The developed edges of the matrices 16 and 20 comprise the actual shifting portions, and alternating with these portions on positions representing a neutral station allowing time for operation of the clutch as previously described. Operating simultaneously on a given roller 28 may be, for example, a hill on matrix 16 and a valley on matrix 20, or vice versa.

Before going into reverse, the selective shift control member, not yet described, is moved into neutral, in accordance with the present practice of going into neutral before reverse. This preparatory shift brings valleys of the matrices 16 and 20 to the rollers 28, and the valleys are of such depth as to permit engagement of the rollers with the hills of the developed edges of the corresponding reverse matrices 40, when they move.

A co-operative effect takes place between the pair of matrices 16, 20 and the pair of reverse matrices 40—40 when a shift is made from reverse to neutral, which shift occurs in a transition from reverse gear to a forward gear. The matrices 40—40, in their progressive movement during reverse drive, move the rollers 28 until they come into contact with the edges of matrices 16 and 20 which are at rest while the matrices 40—40 are in motion. Thus, the matrices 40—40 transfer the rollers 28 to the edges of matrices 16, 20. When the matrices 40—40 come to rest at neutral, with the rollers 28 already transferred to matrices 16, 20, deeply recessed parts of the matrices 40—40 lie opposite the rollers 28, as illustrated in Figure 3. Thus, the rollers are free to move under the action of matrices 16, 20, particularly the deeper parts thereof, without interference by the matrices 40—40. For going into and out of reverse gear, the clutch may be foot operated, in the usual manner or automatically operated by the use of a clutch matrix associated with the reverse matrices 40—40 in the same manner that the clutch matrix 32 is associated with the forward matrices 16 and 20. In the latter case it may be preferable to provide also for foot operation of the clutch in reverse gear, in addition to the automatic operation, for emergency or unusual conditions.

The electrical system is illustrated in Figures 4 and 5. The control is exercised from a control box 51 in the face of which is formed a lengthwise slot 52 having several lateral branches 53 with a pair of bus bars 54 in the slot and pairs of contacts 55, 56, 57 and 58 in the branches, representing respectively neutral, low, second, high and reverse gear. In the slot 52 is slidably mounted an operating handle 59 carrying a contact 60 adapted to engage and close a circuit through any of the pairs of contacts previously mentioned. The handle 59 is translucent and contains a light with suitable electrical connections (not shown).

At selected stations along the edge of one of the pair of matrices 16 and 20, say the matrix 16, are provided solenoids 54A, 55A, 56A, 57A, and corresponding respectively to the pairs of contacts 54, 55, 56 and 57. A similar solenoid 58A, corresponding to contact 58, lies adjacent to the edge of one of the matrices 40. One of the contacts of each pair is joined by a conductor 61 to one side of a battery 62. The other contact of each pair is joined by a conductor 63 to the corresponding solenoid and is continued from the solenoid at 63' to the other side of the battery 62. Thus, the bridging of any pair of contacts closes a circuit through the corresponding solenoid.

Each solenoid has an armature 64 which is moved, when the solenoid is energized, into the path of a tab or cam 65 or 70 carried by the edge of the adjacent matrix 16 or 40. In so moving, the conductive forward end of the armature bridges a pair of contacts 54B, 55B, 56B, 57B, or 58B corresponding to the adjacent solenoid. One contact of each of the latter pairs is joined by a conductor 66 to one side of the battery 62, or to the conductor 63'. The remaining contact of each of these pairs, except the pair 58B, is joined by a conductor 67 to one end of the clutch solenoid 12, the other end of the solenoid being connected by a conductor 68 to the remaining side of the battery 62.

One of the contacts of the pair 58B of the reverse gear unit is joined by a conductor 67' to one end of the reverse clutch solenoid 46, the other end of the solenoid being connected by a conductor 68' into the conductor 68 leading to the battery 62.

When a circuit through the solenoid 12 has been completed at any one of the solenoids spaced around the matrix 16, the clutch 7, 11 will be engaged and the matrices 16 and 20 started in motion. The moving matrices actuate the carriage 27 until the tab 65 arrives at the projected plunger 64 to open the clutch circuit at that point and bring the matrices to rest. It will be understood in this connection that the armatures of the clutches are automatically withdrawn to disengage the clutches, by a spring or otherwise, when the clutch operating circuit is broken.

The circuit-making plungers 64 are so arranged with respect to the matrix 16 as to be engaged by the tab 65 when the matrices have moved the carriage 27 and the lever 31 to the position selected at the control box 51. When one of the higher gear ratios is selected at the box 51, the matrices move the lever 31 successively and progressively through the lower ratios and neutrals until the mechanism is stopped at the selected ratio in the manner described. In other words, if the handle 59 is shifted from neutral to high gear position, the transmission mechanism will go through the lower gear ratios and neutrals until coming into high gear, although only the one movement of the handle 59 is necessary. The transmission mechanism remains in the selected gear ratio, after opening of the clutch circuit at the corresponding plunger 64, until the handle 59 is shifted to a new position. In parking the vehicle, it is advisable to bring the handle to neutral position, anywhere in the slot 52, or at least to do this before starting the motor again, as is customary with the conventional gear shift mechanism. The usual ignition switch will break the circuit from the battery to the contacts in box 51.

The tab 70 carried by one of the reverse matrices 40—40 and engageable with the plunger 64 of the reverse solenoid 58A opens the circuit of the reverse clutch solenoid 46, in the manner described, when the tab arrives at this plunger. With the circuit thus opened, the reverse matrices 40—40 remain stationary and hold the gear shift lever in reverse position.

In order to take the matrices 40—40 out of reverse position while the circuit is open at contacts 58B, another solenoid 71A, similar to the "A" series previously described, is provided. One end of the solenoid is connected by a conductor 72 into the conductor 61 that leads to one of the contacts 54 of the neutral unit. The other end of the solenoid is joined by a conductor 76 to the battery 62, the other side of which is connected to the remaining contact 54 through a conductor 61. Thus, when the contacts 54 are bridged, the solenoid 71A as well as the solenoid 54A is energized.

The plunger 74 of solenoid 71A is adapted to bridge a pair of contacts 75B similar to the "B" series previously described. One of the contacts 75B is connected to one side of the battery by a conductor 76' joining conductor 76. The other contact 75B is joined by a conductor 77 into the conductor 67' leading to the reverse solenoid 46, the other end of which solenoid is returned by conductor 68' to the other side of the battery. It is now evident that the matrices 40—40 will come to neutral position, if not already there, when the contactor 60 is engaged with contacts 54. If the matrices 40—40 are already in neutral, the tab 70 holds the circuit open at contacts 75B, so that there is no action.

Inasmuch as all the matrices are geared to the timing gear shaft 5 which runs in proportion to engine speed, the shifting operation occurs at a rate having a fixed ratio to the engine speed. The effect is that the rate of gear shifting, as well as the engine speed, is controlled from the accelerator pedal.

There will be little or no gear clash in the operation of this device, due to the progressive action of gear engagement as herein disclosed and the synchronous operation of the gear shifting matrices resulting from their connection to the motor. The synchronous effect caused by the timed relation between the pairs of gear shifting matrices and the clutch matrix produce a quiet gear engagement.

In the rare cases of improper tooth engagement of the gears, the spring 31 shown in Figures 2 and 3 permits a yielding of the gear shift lever 31' to prevent breakage or damage of the shifting mechanism and to permit perfect engagement after a few teeth have passed.

In starting the automobile from rest (neutral) and shifting into high gear, even though there should be a slight gear tooth misalignment (neutral to low), the geared relation of the mechanism between clutch operation and gear operation (low to neutral); (neutral to second); (second to neutral); (neutral to high) will cause a perfect mesh of the gear teeth.

Although a specific embodiment of the invention has been illustrated and described, it will be understood that various alterations in the details of construction may be made without departing from the scope of the invention, as indicated by the appended claims.

What I claim is:

1. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage.

2. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, and a third matrix having a driving connection with one of the first named matrices and having a developed edge, and a guided clutch actuating rod having one end engaging said last named developed edge to be actuated thereby.

3. An automatic gear shifting device comprising a pair of intersecting matrices having each a developed edge, means for propelling said matrices, a pair of shafts mounted at the same angle to each other as said matrices, a pair of guide rods slidably mounted on said shafts respectively and parallel to said matrices, a carriage having a sliding movement on both of said rods, rollers carried by said rods and engaging said developed edges, and a gear shifting member carried by said carriage.

4. An automatic gear shifting device comprising a pair of intersecting matrices having each a developed edge, means for propelling said matrices, a pair of shafts mounted at the same angle to each other as said matrices, a pair of guide rods slidably mounted on said shafts respectively and parallel to said matrices, a carriage having a sliding movement on both of said rods, rollers carried by said rods and engaging said developed edges, and a gear shifting member carried by said carriage, and means for rotating said shafts.

5. An automatic gear shifting device comprising a pair of intersecting matrices having each a developed edge, means for propelling said matrices, a pair of shafts mounted at the same angle to each other as said matrices, a pair of guide rods slidably mounted on said shafts respectively and parallel to said matrices, a carriage having a sliding movement on both of said rods, rollers carried by said rods and engaging said developed edges, and a gear shifting member carried by said carriage, and means for yieldingly holding said rollers against said edges.

6. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, a cushioning member carried by said carriage, and a gear shifting member carried by said cushioning member.

7. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, a driving shaft turning in constant ratio to the engine speed, and means for connecting said propelling means to said driving shaft.

8. An automatic gear shifting device comprising a pair of intersecting matrices each having a developed edge, means for propelling said matrices, a carriage mounted in the angle between said matrices for movement in any direction in a plane, contact members extending from said carriage and engaging said developed edges respectively, whereby said carriage is actuated from said matrices, and a gear shifting member carried by said carriage.

9. An automatic gear shifting device comprising a pair of matrices each having a developed edge, electrically controlled means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, a selective multiple switch for controlling said means, circuit makers connected respectively to the poles of said switch and operable therefrom to circuit-making position, and a member movable with one of said matrices and adapted to move said circuit makers from circuit-making to circuit-breaking position.

10. An automatic gear shifting device comprising a pair of matrices each having a developed edge, electrically controlled means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, a selective multiple switch for controlling said means, circuit makers connected respectively to the poles of said switch and operable therefrom to circuit-making position, and a member carried by one of said matrices and adapted to move said circuit makers from circuit-making to circuit-breaking position.

11. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, an electrically operated clutch in said propelling means, pairs of spaced contacts wired to said clutch, a solenoid for each pair of contacts having a plunger engageable with the corresponding pair to operate said clutch, another pair of spaced contacts for each solenoid and wired thereto and representing various gear relations, a common contactor engageable selectively with the last named contacts to energize the solenoids, said solenoids being mounted in selected positions along one of said matrices, and a cam carried by said matrix and adapted to engage the plunger of any energized solenoid and move it to circuit-breaking position with respect to the contacts engageable thereby, whereby to release said clutch.

12. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, another pair of matrices movable independently of the first named matrices and adapted to actuate said carriage to reverse gear position.

13. An automatic gear shifting device comprising a pair of intersecting matrices having each a developed edge, means for propelling said matrices, a pair of shafts mounted at the same angle to each other as said matrices, a pair of guide rods slidably mounted on said shafts respectively and parallel to said matrices, a carriage having a sliding movement on both of said rods, rollers carried by said rods and engaging said developed edges, and a gear shifting member carried by said carriage, another pair of matrices respectively parallel to the first named matrices and movable independently thereof, said other pair having developed edges engaging said rollers and adapted to actuate said carriage to reverse position, said other pair being operatively connected to said propelling means.

14. An automatic gear shifting device comprising a pair of intersecting matrices having each a developed edge, means for propelling said matrices, a pair of shafts mounted at the same angle to each other as said matrices, a pair of guide rods slidably mounted on said shafts respectively and parallel to said matrices, a carriage having a sliding movement on both of said rods, rollers carried by said rods and engaging said developed edges, and a gear shifting member carried by said carriage, another pair of matrices respectively parallel to the first named matrices and movable independently thereof, said other pair having developed edges engaging said rollers and adapted to actuate said carriage to reverse position, said other pair being operatively connected to said propelling means, a selective multiple switch for controlling said means, circuit makers connected respectively to the poles of said switch and operable therefrom to circuit-making position, a member movable with one of the first named matrices and adapted to move said circuit makers from circuit-making to circuit-breaking position, two similar circuit makers connected to poles of said switch and operable therefrom to circuit-making position, another member movable with one of said reverse matrices and adapted to open the last named circuit makers respectively when the last named matrix is in reverse position or neutral position.

15. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, and another pair of matrices having developed edges adapted to engage said contact members and actuate said carriage, the developed edges of both pairs of matrices being so shaped and related to each other as to transfer said contact members from engagement with one pair to engagement with the other pair.

16. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, and a third matrix having a driving connection with one of the first named matrices and having a developed edge, and a guided clutch actuating rod having one end engaging said last named developed edge to be actuated thereby, a driving shaft turning in constant ratio to the engine speed, and means for connecting said propelling means to said driving shaft, whereby said pair of matrices and the third matrix operate in synchronism.

17. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, said matrices being adapted to move said shifting member continuously through several gear ratio positions.

18. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, another pair of matrices movable independently of the first named matrices and adapted to actuate said carriage to reverse gear position, means for propelling the second pair of matrices, and means for selectively operating either of said propelling means.

19. An automatic gear shifting device comprising a pair of matrices each having a developed edge, means for propelling said matrices, a carriage supported adjacent to said matrices for movement in any direction in a plane, contact members extending from said carriage and engaging said developed edges, whereby said carriage is actuated from said matrices, and a gear shifting member carried by said carriage, another pair of matrices having developed edges adapted to engage said contact members and actuate said carriage through a different path, means for propelling the second pair of matrices, and means for selectively operating either of said propelling means.

GLENN W. WATSON.